(12) United States Patent
Katano et al.

(10) Patent No.: US 7,937,754 B2
(45) Date of Patent: May 3, 2011

(54) INFORMATION PROCESSING APPARATUS, CONTROL METHOD FOR THE APPARATUS, AND INFORMATION PROCESSING SYSTEM

(75) Inventors: Kiyoshi Katano, Chiba (JP); Nobuyuki Iwauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 11/939,769

(22) Filed: Nov. 14, 2007

(65) Prior Publication Data

US 2008/0120610 A1 May 22, 2008

(30) Foreign Application Priority Data

Nov. 20, 2006 (JP) .................. 2006-313116

(51) Int. Cl.
*G06F 21/00* (2006.01)
(52) U.S. Cl. ............... 726/18; 726/19; 726/20; 726/21; 726/22; 726/23; 726/24; 726/25
(58) Field of Classification Search ............... 726/18–25
See application file for complete search history.

(56) References Cited

U.S. PATENT DOCUMENTS

| | | | | |
|---|---|---|---|---|
| 6,401,208 B2 * | 6/2002 | Davis et al. | ............... | 713/193 |
| 7,353,388 B1 * | 4/2008 | Gilman et al. | ............... | 713/168 |
| 7,568,095 B2 * | 7/2009 | Thornton et al. | ............... | 713/156 |
| 2002/0178051 A1 * | 11/2002 | Golden et al. | ............... | 705/14 |
| 2004/0025036 A1 * | 2/2004 | Balard et al. | ............... | 713/189 |
| 2005/0044363 A1 * | 2/2005 | Zimmer et al. | ............... | 713/170 |
| 2005/0080899 A1 | 4/2005 | Vogel et al. | | |
| 2005/0081025 A1 * | 4/2005 | Thornton et al. | ............... | 713/155 |
| 2006/0200681 A1 * | 9/2006 | Kato et al. | ............... | 713/193 |
| 2007/0204153 A1 * | 8/2007 | Tome et al. | ............... | 713/164 |
| 2008/0022395 A1 * | 1/2008 | Holtzman et al. | ............... | 726/19 |

FOREIGN PATENT DOCUMENTS

| | | |
|---|---|---|
| JP | 2003-186690 A | 7/2003 |
| JP | 2005-006076 A | 1/2005 |
| JP | 2005-117277 A | 4/2005 |
| JP | 2005-524910 T | 8/2005 |
| JP | 2005-318572 A | 11/2005 |
| JP | 2005-354200 A | 12/2005 |
| JP | 2006-239930 A | 9/2006 |
| WO | WO2005060256 A1 | 6/2005 |

* cited by examiner

*Primary Examiner* — Nasser Moazzami
*Assistant Examiner* — Ghazal Shehni
(74) *Attorney, Agent, or Firm* — Canon U.S.A., Inc. I.P. Division

(57) ABSTRACT

Update firmware is stored as one binary file. The binary file includes firmware data necessary for operating a controller unit and root certificate data necessary for a printer apparatus to establish secure communication with a content server. Specific information in the root certificate data is extracted from the update firmware, and the extracted specific information is used to update a management table of the root certificate provided in a RAM. With this configuration, it is possible for an information processing apparatus to reliably acquire and update the root certificate data without greatly changing the original functional configuration.

2 Claims, 10 Drawing Sheets

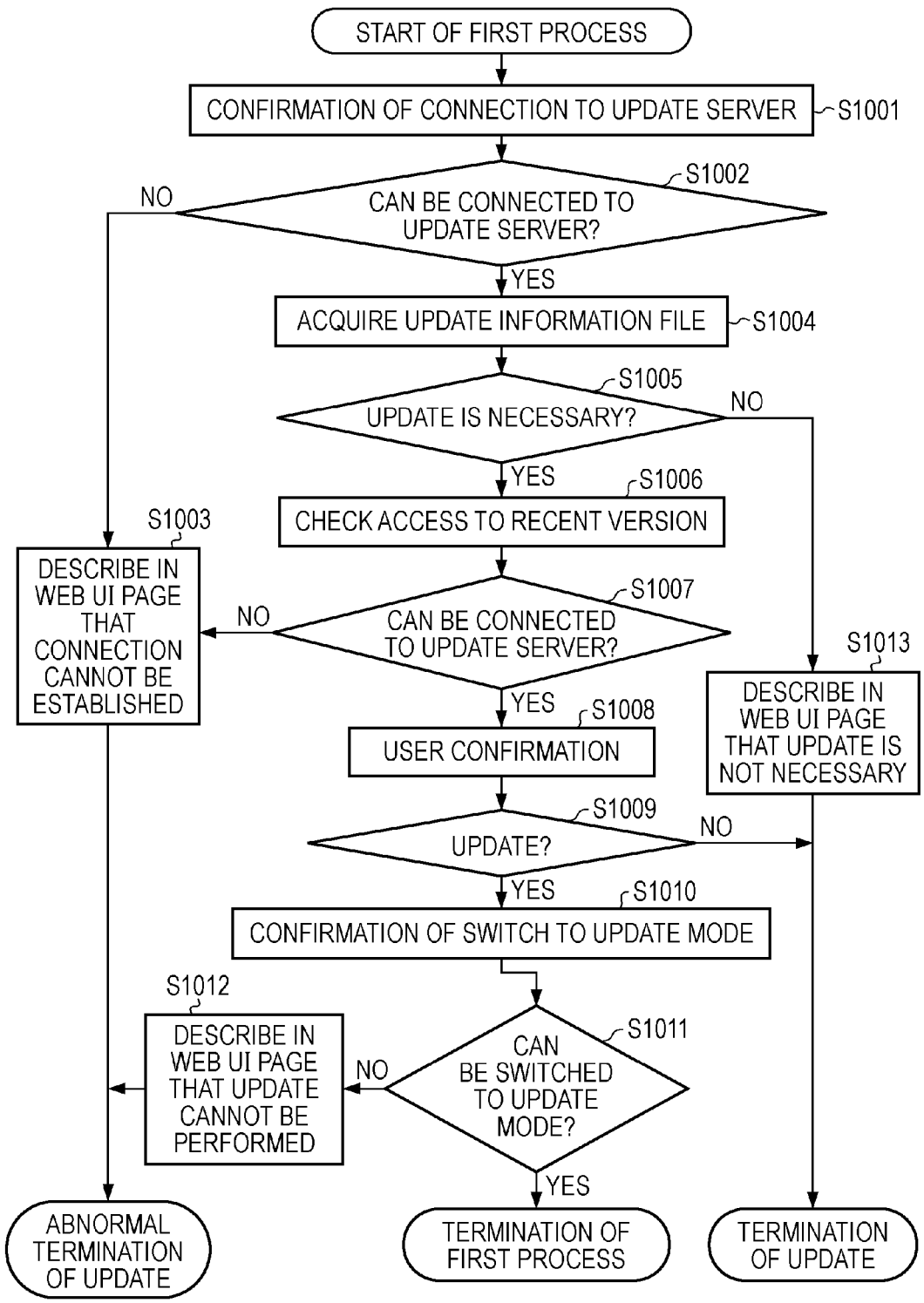

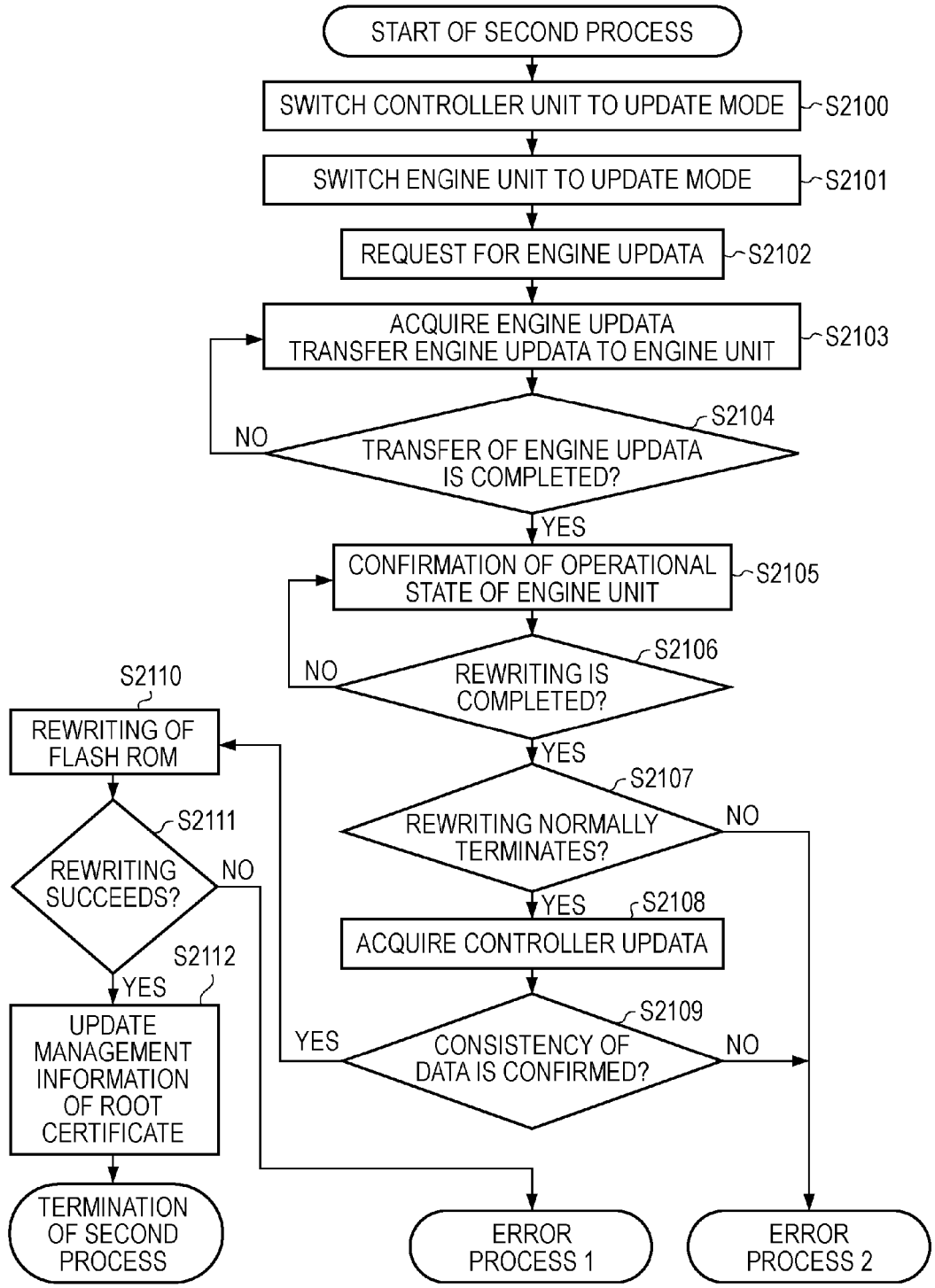

FIG. 8

```xml
<?xml version="1.0" ?>
<printer_firmware_update>
   <controller_firmware    version="1.2"    rootca1_serialcode="XXX001"
       rootca2_serialcode="AAA100"
       url="http://update.com/latest/controller.bin" />

<engine_firmware                                      version="1.1"
       url="http://update.com/latest/engine.bin" />
   <controller_news    version="1.2"    rootca1_serialcode="XXX001"
       rootca2_serialcode="AAA100" update_type="rootca_update" />

<engine_news version="1.1" update_type="bug_fix" />

</printer_firmware_update>
```

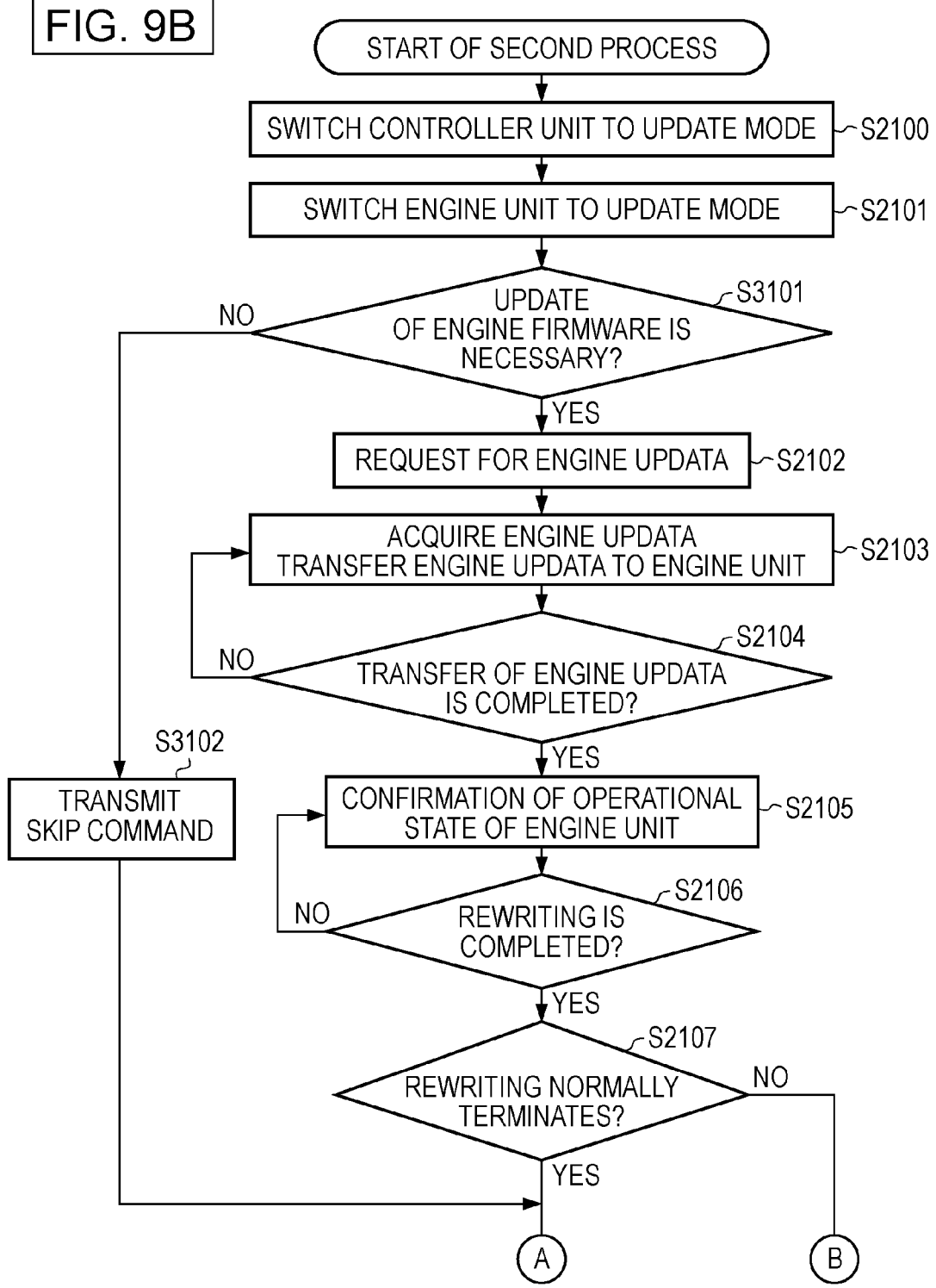

INFORMATION PROCESSING APPARATUS, CONTROL METHOD FOR THE APPARATUS, AND INFORMATION PROCESSING SYSTEM

BACKGROUND OF THE INVENTION

1. Field of the Invention

The present invention relates to information processing apparatuses, control methods for the information processing apparatuses, and information processing systems.

More particularly, the present invention relates to an information processing apparatus capable of updating the firmware of the information processing apparatus and digital certificate information concerning the information processing apparatus, a control method for the information processing apparatus, and an information processing system.

2. Description of the Related Art

Software called firmware is currently incorporated in information processing apparatuses including printers, digital still cameras, and portable music players. The firmware is incorporated in apparatuses, such as printers and digital still cameras, to control the hardware installed in the apparatuses. For example, the firmware is exemplified by the basic input/output system (BIOS) in a personal computer.

The firmware can be modified (updated) later in order to add functions or perform troubleshooting. In the update of the firmware incorporated in an apparatus, for example, a storage medium, such as a compact disc-read only memory (CD-ROM), having a new version of firmware written thereon is delivered, the firmware is read out from the storage medium, and an old version of firmware incorporated in the apparatus is updated with the new version of firmware.

In recent years, services for delivering new versions of firmware via networks have become increasingly common along with the popularization of the networks including the Internet. For example, Japanese Patent Laid-Open No. 2003-186690 discloses deliver of a new version of firmware via a network.

In addition, recent information processing apparatuses, such as printers, digital still cameras, and portable music players, have functions of connecting to the Internet. Accordingly, it is necessary to provide digital certificates, which are originally intended for computers, in such information processing apparatuses in order to ensure the security of the apparatuses in encryption communication, for example, Secure Socket Layer (SSL).

The digital certificates are used to verify the validity of, for example, digital signatures and are generally issued by trusted third-party certification authorities (called certificate authorities). The issued digital certificates can be used to verify, for example, that servers to be accessed support the encryption communication or that the providers of Web sites really exist.

The digital certificates include root certificates signed and issued by certificate authorities in order to verify the validity of the certificate authorities. Usually, Web browsers and network controllers involved in the encryption communication hold the root certificates issued by the certificate authorities. In communication with Web sites (Web servers), it is determined whether the server certificates transmitted from the Web sites (Web servers) are valid. In the determination of the validity of the server certificates, first, it is determined whether the server certificates issued by the certificate authorities are valid. If the server certificates are valid, then, it is determined whether the certificate authorities can be trusted. If users hold the root certificates digitally signed by the certificate authorities in advance, it is determined that the Web sites (Web servers) can be trusted.

The root certificates and the server certificates usually have expiration dates. Accordingly, technologies of updating such certificates are proposed (for example, Japanese Patent Laid-Open No. 2006-239930).

Consequently, in order for information processing apparatuses, such as printers, to support the encryption communication over the Internet, it is necessary for the information processing apparatuses to have functions for realizing acquisition and update of root certificates, as disclosed in Japanese Patent Laid-Open No. 2006-239930.

However, in the acquisition of root certificates by the technology described in Japanese Patent Laid-Open No. 2006-239930, it is necessary to set in advance information indicating where the root certificates held by printer apparatuses are acquired (for example, the paths of the certificate authorities). Accordingly, it is not possible for the printer apparatuses to automatically acquire new root certificates when new certificate authorities are added.

In addition, as described above, information processing apparatuses have functions of realizing the acquisition and update of the firmware. However, in terms of the cost of the apparatuses, it is not desired that the apparatuses be provided with the functions of acquiring the digital certificates, such as the root certificates, in addition to the functions of acquiring and updating the firmware.

SUMMARY OF THE INVENTION

The present invention provides an information processing apparatus capable of reliably acquiring and updating digital certificate data and capable of acquiring the digital certificate data without greatly changing the original functional configuration, a control method for the information processing apparatus, and an information processing system.

According to an embodiment of the present invention, an information processing apparatus includes a storage unit configured to store firmware data which controls the information processing apparatus and digital certificate data used in secure communication, a managing unit configured to manage first specific information in the digital certificate data stored in the storage unit, a first acquiring unit configured to acquire second specific information in digital certificate data from firmware data stored in an external apparatus, a second acquiring unit configured to acquire the firmware data stored in the external apparatus if the second specific information is different from the first specific information, and an updating unit configured to extract at least the second specific information in the digital certificate data from the firmware data to update the first specific information with the extracted second specific information.

According to another embodiment of the present invention, a method for an information processing apparatus including a storage unit that stores firmware data used for controlling the information processing apparatus and digital certificate data used in secure communication and a managing unit that manages first specific information in the digital certificate stored in the storage unit includes acquiring second specific information in digital certificate data from firmware data stored in an external apparatus, acquiring the firmware data if the second specific information is different from the first specific information, and extracting at least the second specific information in the digital certificate data from the firmware data to update the first specific information with the extracted second specific information.

According to another embodiment of the present invention, an information processing apparatus using digital certificate data used in secure communication to establish communication with an external content server includes an acquiring unit configured to acquire firmware to update firmware that controls operation of the information processing apparatus, a storage unit, and a control unit configured to store the firmware acquired in a predetermined area in the storage unit and to control the operation of the information processing apparatus with the stored firmware. If the control unit acquires file data including the digital certificate data as part of the firmware, the control unit extracts specific information in the digital certificate data from the file data and manages the specific information separately from version information about the firmware.

According to another embodiment of the present invention, a method for an information processing apparatus using digital certificate data used in secure communication to establish communication with an external content server includes acquiring firmware to update firmware that controls operation of the information processing apparatus, storing the acquired firmware in a predetermined area in a storage unit, and controlling the operation of the information processing apparatus with the stored firmware. If file data including the digital certificate data as part of the firmware is acquired, the controlling extracts specific information in the digital certificate data from the file data and manages the specific information separately from version information about the firmware.

Further features and aspects of the present invention will become apparent from the following description of exemplary embodiments with reference to the attached drawings.

BRIEF DESCRIPTION OF THE DRAWINGS

FIG. 6 is a flowchart illustrating an example of a first update process according to the first exemplary embodiment of the present invention.

FIG. 7 is a flowchart illustrating an example of a second update process according to the first exemplary embodiment of the present invention.

FIG. 8 illustrates an example of the content of a firmware update information file.

FIGS. 9A and 9B are flowcharts illustrating an example of a process of updating firmware according to a second exemplary embodiment of the present invention.

DESCRIPTION OF THE EMBODIMENTS

Exemplary embodiments of the present invention will herein be described in detail in accordance with the attached drawings.

An information processing apparatus is exemplified by a printer apparatus in a first exemplary embodiment of the present invention.

Figure 1:
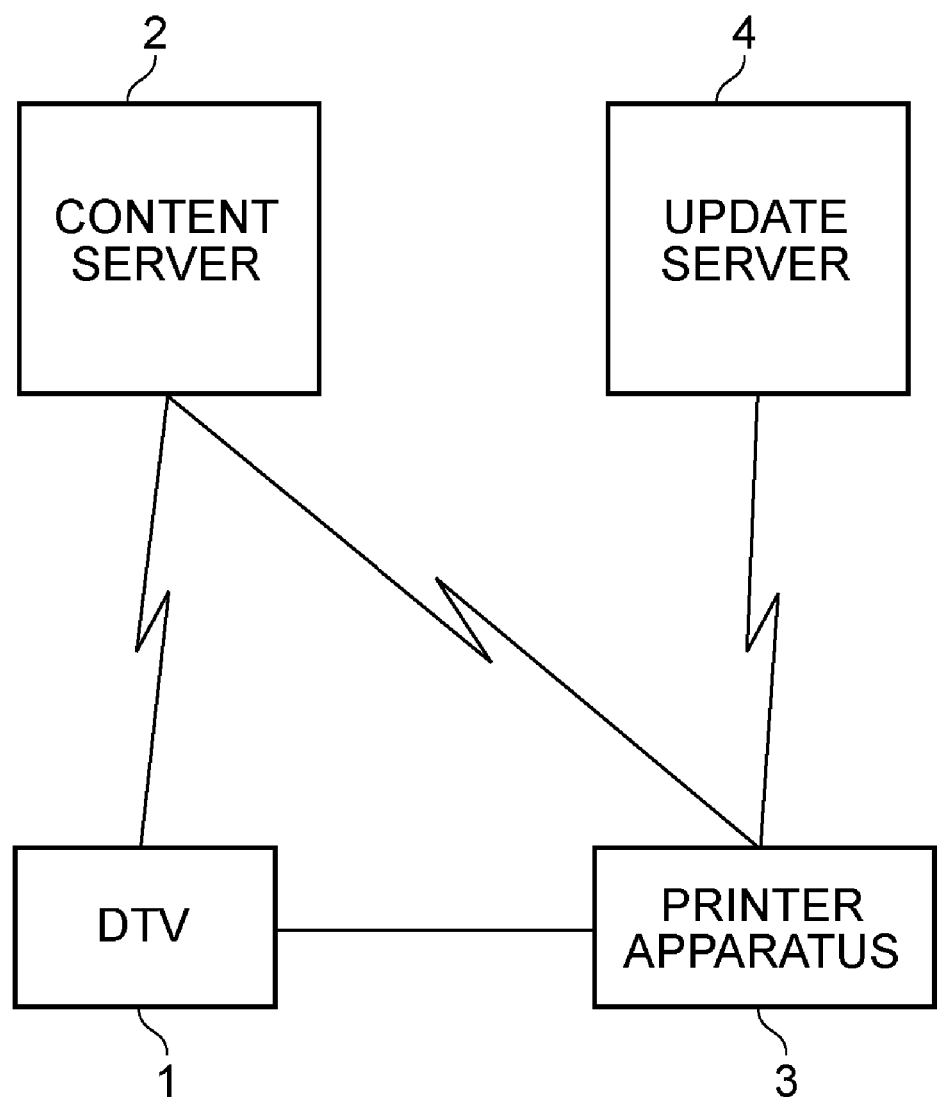
FIG. 1 is a block diagram illustrating an example of the configuration of a printing system according to a first exemplary embodiment of the present invention.

FIG. 1 is a block diagram illustrating an example of the configuration of a printing system including a printer apparatus exemplified as an information processing apparatus according to the first exemplary embodiment of the present invention. Referring to FIG. 1, a digital television (hereinafter referred to as DTV) 1 is a network TV terminal conforming to a network TV standard, for example, NET TV 2.0 defined by Networked Digital Television Consortium.

The NET TV standard defines specifications required for network terminals when digital televisions are used as the network terminals and operational guidelines for content and services received with network TV terminals. The NET TV standard includes specifications of printers printing data required by the network TV terminals.

The DTV 1 is connected to a printer apparatus 3 over a network, such as a local area network (LAN), so as to communicate with the printer apparatus 3. Since the LAN is connected to the Internet via a router (not shown), the DTV 1 and the printer apparatus 3 can access a content server 2 and an update server 4, which serve as Hyper Text Transfer Protocol (HTTP) servers (Web servers) on the Internet.

Specifically, the DTV 1 can access the content server 2 on the network over the Internet to display a Web page via a Web browser that supports the NET TV Standard and that is installed in the network TV terminal, in addition to normal broadcast reception. The DTV 1 can also display data broadcast content defined by Association of Radio Industries and Business (ARIB). In addition, the DTV 1 can print printing content included in the data broadcast content or printing content conformed to the NET TV Standard by using the printer apparatus 3.

Furthermore, the DTV 1 can issue an instruction to print printing content included in the data broadcast content or printing content included in contents conformed to the NET TV Standard to the printer apparatus 3. The ARIB defines three printing formats in data broadcasting via DTV 1: (1) Print File format, (2) Print Uniform Resource Identifier (URI) format, (3) Print Static Screen format.

In (1) Print File format, the real file of printing content is transmitted to the DTV 1 as the data broadcast content. The DTV 1 transmits the real file of the printing content to the printer where printing is performed on the basis of the real file.

In (2) Print URI format, URI information indicating where the real file of printing content exists is transmitted to the DTV 1 as the data broadcast content. The DTV 1 transmits the URI information to the printer. The printer acquires the real file of the printing content at the URI and performs printing on the basis of the acquired real file.

In (3) Print Static Screen format, the DTV 1 transmits a still image, such as a data broadcast screen, which is captured to the printer where printing of the still image is performed.

The real file of the printing content acquired by the printer in (1) Print File format or (2) Print URI format is described in a structured document called Extensible Hyper Text Markup Language (XHTML)-Print document.

However, the ARIB does not define connection between the DTV and the printer, detection of the printer on the network, and acquisition of a state in detail. Specifications relating to printing, which are not defined in the ARIB, are defined in the NET TV 2.0 standard. The printing content included in contents conformed to the NET TV Standard is also described in the XHTML-Print document.

The DTV 1 and the printer apparatus 3, which are terminals supported in the NET TV standard, conform to UPnP Print-Enhanced:1 service. Since the details of these standards are not pertinent to the present invention, a detailed description of such standards is omitted herein.

The NET TV 2.0 standard defines HTTP/1.1 as the communication protocol between the content server 2 and the printer apparatus 3. In addition, it is necessary to support SSL. 3.0 or Transport Layer Security (TLS) 1.0 in order to realize secure communication between the content server 2 and the printer apparatus 3. In other words, it is necessary to provide the root certificate of a root certificate authority, which is a trusted third-party authority, in the printer apparatus 3 in order to confirm the digital certificate (server certificate) of the content server 2. The provision of the root certificate in the printer apparatus 3 enables secure HTTP communication between the content server 2 and the printer apparatus 3.

The update server 4, which is an external apparatus, is an HTTP server capable of HTTP communication. The update server 4 stores firmware update information files used for updating the firmware of the printer apparatus 3 and firmware data, which are the real files of the firmware. The printer apparatus 3 downloads the firmware data from the update server 4 to update an older version of firmware of the printer apparatus 3 to the downloaded new version of firmware. The firmware data and the firmware update information file are described below.

Since the functional blocks serving as the HTTP servers in the content server 2 and the update server 4 are not pertinent to the present invention, a description of the functional blocks is omitted herein.

Figure 2:
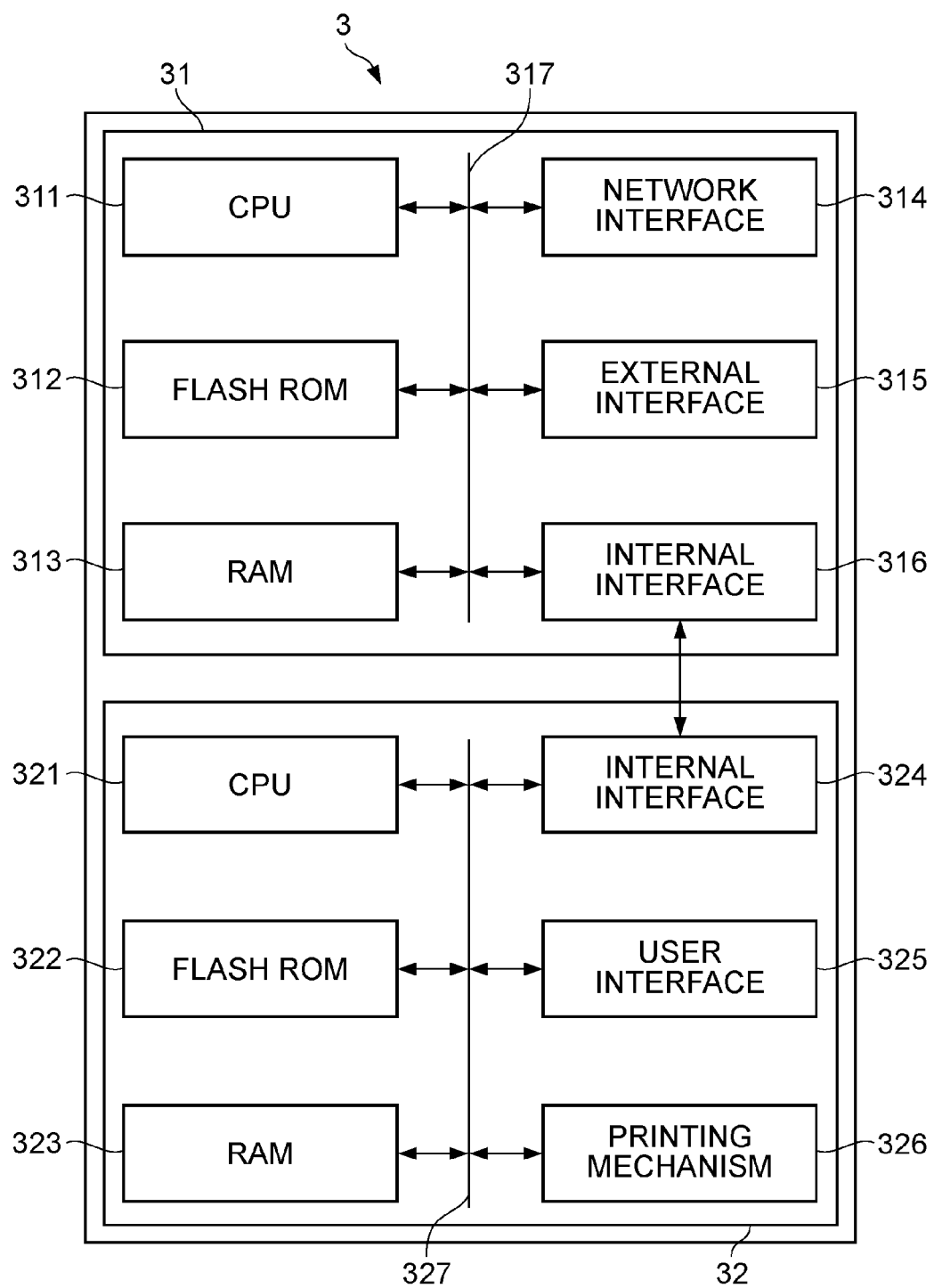
FIG. 2 is a block diagram illustrating an example of the internal configuration of a printer apparatus shown in FIG. 1.

FIG. 2 is a block diagram illustrating an example of the internal configuration of the printer apparatus 3.

The printer apparatus 3 is divided into a controller unit 31 performing network-related control and an engine unit 32 controlling the main body of the printer apparatus 3. The controller unit 31 includes a central processing unit (CPU) 311 controlling the entire controller unit 31. A flash read only memory (ROM) 312 in the controller unit 31 is a storage section in which the firmware data and root certificate data are stored. A random access memory (RAM) 313 in the controller unit 31 is a storage section used as various working areas and a storage area of predetermined management data. The CPU 311 operates in accordance with the firmware stored in the flash ROM 312 and the management data stored in the RAM 313 by using the RAM 313 as the working areas.

A network interface 314 in the controller unit 31 is an interface connecting the printer apparatus 3 to the LAN. An external interface 315 in the controller unit 31 is a device interface for, for example, a universal serial bus (USB). Accordingly, the printer apparatus 3 can be connected to, for example, a digital still camera (not shown) having a USB interface via the USB.

An internal interface 316 in the controller unit 31 is connected to the engine unit 32 to transmit and receive data between the controller unit 31 and the engine unit 32. All the above-described blocks are connected to a system bus 317 in the controller unit 31.

The engine unit 32 includes a CPU 321 controlling the entire engine unit 32. A flash ROM 322 in the engine unit 32 is a storage section in which the firmware is stored. A RAM 323 in the engine unit 32 is used as various working areas. The CPU 321 operates in accordance with the firmware stored in the flash ROM 322 by using RAM 323 as the working areas.

An internal interface 324 in the engine unit 32 is connected to the network interface 314 in the controller unit 31 to transmit and receive data between the controller unit 31 and the engine unit 32. A user interface 325 in the engine unit 32 includes an input device including keys provided on an operation panel (not shown) of the printer apparatus 3 and a display device used for displaying information. The user interface 325 is used to receive an instruction from a user to the printer apparatus 3 and to display a status of the printer apparatus 3. A printing mechanism 326 in the engine unit 32 actually performs printing and operates under the control of the CPU 321. All the above-described blocks are connected to a system bus 327 in the engine unit 32.

Figure 3:
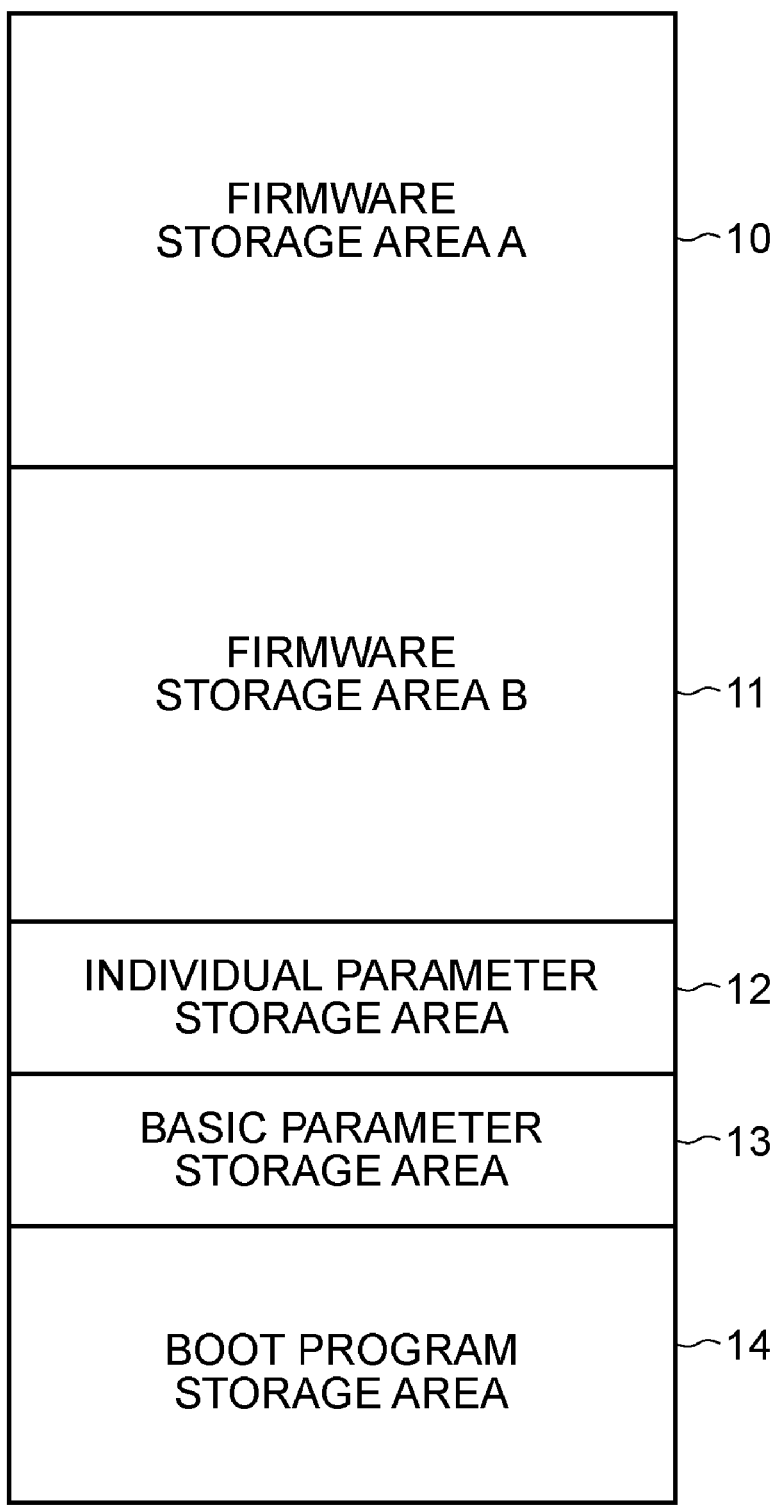
FIG. 3 is a conceptual diagram illustrating an example of the configuration of the storage area in a flash ROM in the printer apparatus shown in FIG. 2.

FIG. 3 is a conceptual diagram illustrating a variety of data stored in the storage area in the flash ROM 312 in the controller unit 31 of the printer apparatus 3.

Referring to FIG. 3, the flash ROM 312 in the controller unit 31 includes a firmware storage area A 10 and a firmware storage area B 11 as storage areas of the firmware operating the controller unit 31. At shipment of the printer apparatus 3, the initial version of firmware is stored in either firmware storage area A 10 or firmware storage area B 11, and no firmware is stored in the other storage area.

After a process of updating the firmware, described below, is performed to acquire a new version of firmware, the acquired firmware is stored in the storage area where no firmware was previously stored. On another occurrence of the process of updating the firmware, the new version of firmware is stored (overwritten) in the storage area where the firmware not being used is stored.

An individual parameter storage area 12 includes information specific to the printer apparatus 3, such as the IP address of the printer apparatus 3. Setup information including the sheet sizes used in the printer apparatus 3 is also stored in the individual parameter storage area 12.

A basic parameter storage area 13 includes information about the firmware activated by a boot program described below. Specifically, information about the versions of the firmware stored in the firmware storage area A 10 and the firmware storage area B 11 is stored in the basic parameter storage area 13.

A boot program storage area 14 includes the boot program used for activating the firmware operating in the controller unit 31. The boot program stored in the boot program storage area 14 refers to the information about the versions of the firmware, stored in the basic parameter storage area 13, to determine which firmware is to be activated. The boot program activates the determined firmware.

In addition to the firmware operating in the controller unit 31, root certificate data necessary for the secure communication with the content server 2 is stored in the firmware storage area A 10 and the firmware storage area B 11. How the root certificate data is stored is described below.

Figure 4:
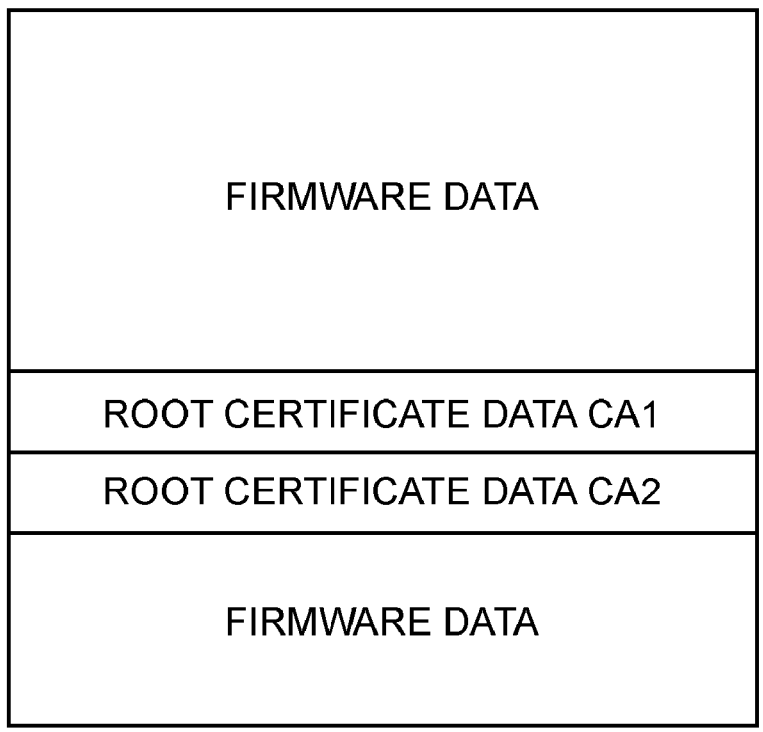
FIG. 4 is a conceptual diagram illustrating an example of the configuration of firmware data.

An example of the configuration of the firmware of the controller unit 31 (hereinafter referred to as controller firmware) will be described with reference to FIG. 4. FIG. 4 is a conceptual diagram illustrating an example of the file configuration of the controller firmware stored in a storage unit (not shown) in the update server 4 as a binary image file. As described above, the update firmware of the controller unit 31 and that of the engine unit 32 in the printer apparatus 3 are stored in the update server 4. Only the controller firmware will be described and a description of the firmware of the engine unit 32 is omitted herein.

The update firmware illustrated in FIG. 4 is stored as one binary file. Firmware data necessary for operating the controller unit 31 and root certificate data necessary for the secure communication between the printer apparatus 3 and the content server 2 are included in the binary file. Two kinds of root certificate data CA1 and CA2 are included in the file configuration illustrated in FIG. 4.

Pointers indicating the positions where the root certificate data CA1 and the root certificate data CA2 are stored in the binary file are described in the firmware data. It is possible to determine where the root certificate data is stored in the binary file by referring to the pointers.

The root certificate data includes the kind of the root certificate data, information concerning the certificate authority, and information specific to the root certificate, such as a serial code and the expiration date allocated to each piece of the root certificate data.

Although the file configuration of the update firmware stored in the update server 4 is described with reference to FIG. 4, this file configuration is typically kept in the firmware storage area A 10 or the firmware storage area B 11 illustrated in FIG. 3. When the update firmware is acquired from the update server 4 and the acquired update firmware is stored in the firmware storage area A 10 or the firmware storage area B 11, the firmware in the storage area has the same file configuration as the one illustrated in FIG. 4.

Although the binary image file illustrated in FIG. 4 has the file configuration in which the root certificate data CA1 and the root certificate data CA2 are arranged between the pieces of the firmware data, the embodiments of the present invention are not limited to this configuration. Any configuration that includes the file configuration in which the firmware data is integrated with the root certificate data is applicable.

As described above, the root certificate data corresponding to the root certificate is held as part of the data file of the controller firmware. Accordingly, it is possible to acquire the root certificate data when the controller firmware is downloaded. In other words, it is sufficient to update the controller firmware in order to acquire the root certificate data.

Figure 5:
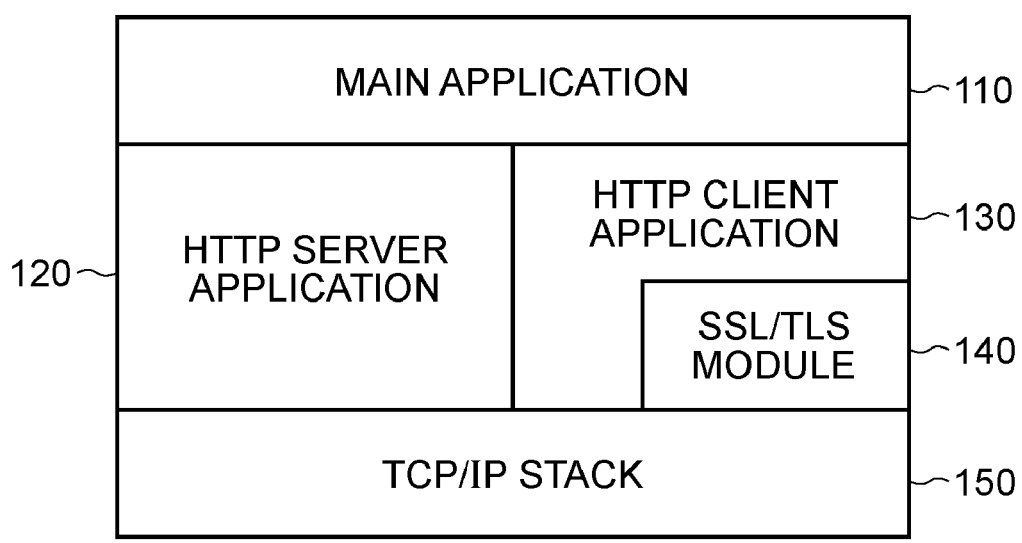
FIG. 5 is a conceptual diagram illustrating an example of the software configuration of a controller unit shown in FIG. 2.

FIG. 5 is a conceptual diagram illustrating an example of the software configuration of the controller unit 31, which relates to the embodiments of the present invention. The software described below is included in the controller firmware.

Referring to FIG. 5, a main application 110 is software used for main control of the controller unit 31. Since the information processing apparatus according to the present embodiment is the printer apparatus 3 connected to the DTV 1, the main application 110 includes a print control module performing a print process requested by the DTV 1.

An HTTP server application 120 generates and manages a presentation page, which is a Web page defined in the UPnP PrintEnhanced:1 service, and a NET TV index page defined in the NET TV 2.0. The HTTP server application 120 operates in cooperation with the main application 110. For example, the HTTP server application 120 generates the presentation page or the NET TV index page in response to an instruction from the main application 110 and displays the state of the printer apparatus 3 or changes the settings thereof in the generated page.

The presentation page and the NET TV index page may be displayed in the display unit of the DTV 1. When the presentation page or the index page is displayed in the display unit of the DTV 1, a user uses the HTTP browser of the DTV 1 to perform HTTP access to the printer apparatus 3 in order to acquire the presentation page. The HTTP browser analyzes structured document data about the acquired presentation page and displays the presentation page. The presentation page has a function of receiving an instruction to update the firmware.

An HTTP client application 130 acquires printing content from the content server 2 in cooperation with the main application 110. The HTTP client application 130 also acquires the firmware update information file and the firmware data from the update server 4.

An SSL/TLS module 140 is invoked by the HTTP client application 130 and is used for the secure connection with the content server 2. Accordingly, the SSL/TLS module 140 uses the root certificate data stored in the flash ROM 312 in the controller unit 31 in order to confirm the reliability of the server certificate transmitted from the content server 2.

A Transmission Control Protocol/Internet Protocol (TCP/IP) stack 150 controls communication between the HTTP server application 120, the HTTP client application 130, and the SSL/TLS module 140 and the external interface 315. This communication enables TCP/IP communication between the DTV 1, the content server 2, and the update server 4 and the printer apparatus 3.

Processes performed in the above software configuration will now be described. It is assumed that printing in the PrintURI format is instructed by the DTV 1.

It is also assumed that the URI indicating the location of printing content transmitted from the DTV 1 to the printer apparatus 3 is (https://xxx.yyy.com/index.html). In the case of this URI, it is necessary to realize secure HTTP communication to conform to Hypertext Transfer Protocol Security (HTTPS). The main application 110 passes the URI to the HTTP client application 130 because the HTTP communication is required in the acquired URI.

The HTTP client application 130 requests the SSL/TLS module 140 to perform processing because the passed URI requires the secure communication. The SSL/TLS module 140 starts communication with the server specified by the URI as a preparation for the secure communication (the TCP/IP stack 150 is used in the actual communication).

The SSL/TLS module 140 acquires the server certificate data from the server and uses the root certificate data held in the printer apparatus 3 to determine whether the secure communication is available. If the secure communication is available, the HTTP client application 130 performs the communication. If the secure communication is not available, the HTTP client application 130 determines whether the communication is performed in a non-secure state or the communication is stopped.

A process of updating the firmware of the controller unit 31 and a process of updating the firmware of the engine unit 32 will now be described with reference to flowcharts.

FIGS. 6 and 7 are flowcharts describing the firmware updating processes. According to the present embodiment, both the firmware of the engine unit 32 and the firmware of the controller unit 31 are updated. In other words, if an update version of any one of the firmware of the engine unit 32, the firmware of the controller unit 31, and the root certificate data exists in the update server 4, all the firmware and the root certificate data are updated.

Each flowchart is started in response to an operation in the presentation page or NET TV index page (hereinafter collectively referred to as a Web UI page) by the HTTP server application 120. The operation in the Web UI page may be manually instructed by the user in the page displayed on the screen of the DTV 1. Alternatively, the operation in the Web UI page may be performed in response to a predetermined instruction issued from the main application 110.

A first update process, among the two firmware updating processes, will now be described with reference to FIG. 6.

Referring to FIG. 6, in Step S1001, the CPU 311 performs confirmation of connection to the update server 4. Since the confirmation of connection to the update server 4 corresponds to a general server access, a description is omitted herein.

In Step S1002, the CPU 311 determines whether the connection to the update server 4 can be established. If the CPU 311 determines that the connection to the update server 4 cannot be established, in Step S1003, the CPU 311 describes in the Web UI page that "the connection to the update server 4 cannot be established" and the update process terminates.

If the CPU 311 determines in Step S1002 that the connection to the update server 4 can be established, the process goes to Step S1004.

In Step S1004, the CPU 311 acquires a firmware update information file from the update server 4. The firmware update information file is a text file described in a structured document in, for example, Extensible Markup Language (XML) format. At least the versions of various update files stored in the update server 4 are described in the firmware update information file.

FIG. 8 illustrates an example of the content of the firmware update information file described in the XML format. In the firmware update information file in FIG. 8, the version number of the controller firmware is described as "1.2", the serial code of the root certificate data CA1 is described as "XXX001", the serial code of the root certificate data CA2 is described as "AAA100", and the version number of the firmware of the engine unit 32 (hereinafter referred to as engine firmware) is described as "1.1". Uniform Resource Locator (URL) information indicating the location of the real file of the firmware (firmware data) is also described in the firmware update information file.

The serial code of the root certificate data is an identification code specific to each root certificate. If the root certificate data CA2, among the root certificate data CA1 and the root certificate data CA2, is updated to new root certificate data, the serial code of the root certificate data CA2 is changed to that of the new root certificate data. The serial code generally includes a combination of the name of the issuer of the root certificate and the code of the root certificate. The combination is specific to each root certificate.

An "update_type" property is described in the firmware update information file in order to indicate why each firmware is updated, although the property is not directly related to the embodiments of the present invention.

Referring back to FIG. 6, after the CPU 311 acquires the firmware update information file in Step S1004, then in Step S1005, the CPU 311 determines whether the update is necessary. If the version of the firmware currently incorporated in the printer apparatus 3 is older than the version of the firmware described in the acquired firmware update information file, the update is necessary. Information about the version of the firmware currently incorporated in the printer apparatus 3 is stored in the basic parameter storage area 13 in the flash ROM 312. Accordingly, in the determination in Step S1005, the version information about the firmware described in the acquired firmware update information file is compared with the version information about the firmware stored in the basic parameter storage area 13.

The serial codes of the root certificate data CA1 and the root certificate data CA2, which are described in the firmware update information file acquired in the first update process, are compared with the serial codes in the current root certificate data managed by the controller unit 31. The serial codes in the root certificate data currently incorporated in the printer apparatus 3 are stored in a management table, described below, in the RAM 313 as specific information. Accordingly, in the determination in Step S1005, the serial codes (second specific information) specific to the root certificate data described in the acquired firmware update information file is compared with the serial codes (first specific information) stored in the management table.

In this comparison, root certificate data different from the root certificate data currently stored in the printer apparatus 3 can be stored in the update server 4. Also in such a case, the CPU 311 determines that the controller firmware is to be updated. For example, if the presence of new root certificate data, such as root certificate data CA3, is described in the firmware update information file illustrated in FIG. 8 in a state in which only the root certificate data CA1 and the root certificate data CA2 are stored in the printer apparatus 3, the CPU 311 determines that the update of the controller firmware is necessary although it is not necessary to update the root certificate data CA1 and the root certificate data CA2. Specifically, the CPU 311 determines whether the root certificate currently held in the printer apparatus 3 differs from the root certificate described in the firmware update information file also in the specific information, such as the name and type, in the root certificate data.

If the CPU 311 determines in Step S1005 that the update is necessary, the process goes to Step S1006. If the CPU 311 determines in Step S1005 that the update is not necessary, the process goes to Step S1013. In Step S1013, the CPU 311 describes in the Web UI page that the update is not necessary. Then, the update process terminates and the printer apparatus 3 moves to a normal operation mode.

In Step S1006, the CPU 311 performs an access check based on the URL indicating the path of the firmware data described in the firmware update information file. In Step S1007, the CPU 311 determines whether connection to the update server 4 storing the firmware data can be established. If the CPU 311 determines that connection to the update server 4 cannot be established, the process goes to Step S1013.

If the CPU 311 determines in Step S1007 that connection to the update server 4 storing the firmware data can be established, the process goes to Step S1008. In Step S1008, the CPU 311 inquires of the user whether the firmware is to be updated via the Web UI page. This inquiry is performed by, for example, describing the update inquiry in the Web UI page and displaying the Web UI page in the DTV 1.

In Step S1009, the CPU 311 determines whether the update of the firmware is instructed by the user in the Web UI page displayed in Step S1008. If the CPU 311 determines that the update of the firmware is instructed, the process goes to Step S1010. If the CPU 311 determines in Step S1009 that the update of the firmware is not instructed, the update process terminates and the printer apparatus 3 moves to the normal operation mode.

In Step S1010, the CPU 311 performs confirmation of switch to an update mode of the firmware. The determination of the confirmation is performed in Step S1011. In Step S1011, the CPU 311 determines whether the printer apparatus 3 can be switched to the update mode. Normally, printing etc. cannot be performed during the update of the firmware. Similarly, the update of the firmware cannot be performed during printing etc. The CPU 311 determines in Step S1011 whether the current printer apparatus 3 is in a state in which the firmware can be updated.

If the CPU 311 determines in Step S1011 that the printer apparatus 3 cannot be switched to the update mode of the firmware, the process goes to Step S1012. In Step S1012, the CPU 311 describes in the Web UI page that the update cannot be performed because other processing is performed and presents the Web UI page to the user. Then, the process terminates.

If the CPU 311 determines in Step S1011 that the printer apparatus 3 can be switched to the update mode of the firmware, the CPU 311 goes to a second update process described below.

Although the CPU 311 inquires of the user whether the firmware is to be updated in Steps S1008 and S1009 to receive an instruction from the user, the instruction from the user may not be received. Accordingly, if the CPU 311 determines in Step S1007 that connection to the update server 4 can be established, the process may skip to Step S1010 to automatically perform the update process without inquiry.

The second update process will now be described with reference to FIG. 7. The second update process includes control based on the main application 110 in the firmware incorporated in the controller unit 31 and processing in the engine unit 32 operating in response to an instruction from the controller unit 31.

FIG. 7 is a flowchart illustrating an example of the second update process in the main application 110 in the controller unit 31. The CPU 311 controls the second update process on the basis of programs described in the main application 110.

If the CPU 311 determines in Step S1011 that the printer apparatus 3 can be switched to the update mode of the firmware, in Step S2100, the CPU 311 switches the controller unit 31 to the update mode. In Step S2101, the CPU 311 issues an instruction to the CPU 321 in the engine unit 32 to switch the engine unit 32 to the update mode.

After the controller unit 31 and the engine unit 32 switch to the update mode, in Step S2102, the CPU 311 requests the update server 4 to acquire updata about the engine firmware (update firmware data about the engine firmware). This acquisition is performed by issuing an HTTP GET method to the URL indicating the engine firmware described in the firmware update information file.

In Step S2103, the CPU 311 sequentially receives updata from the update server 4 through the network interface 314. The CPU 311 then transfers the received updata to the engine unit 32 through the internal interface 316 and the internal interface 324.

In Step S2104, the CPU 311 determines whether all the updata about the engine firmware is acquired and the transfer of the updata about the engine firmware to the engine unit 32 is completed. If the CPU 311 determines that the transfer of the updata is completed, the process goes to Step S2105.

The engine unit 32 uses the transferred updata to update the old version of engine firmware. Although the firmware can be updated by various methods, any update method can be used in the present embodiment. Accordingly, a detailed description of the update process is omitted herein.

In Step S2105, the CPU 311 performs confirmation of the operational state of the engine unit 32. Specifically, the CPU 311 confirms whether the engine firmware is normally updated. Accordingly, the CPU 311 confirms the state of the engine unit 32 and, in Step S2106, determines whether the rewriting of the firmware is completed.

If the CPU 311 determines in Step S2106 that the rewriting of the firmware is completed, the process goes to Step S2107. In Step S2107, the CPU 311 determines whether the update (rewriting) of the engine firmware normally terminates. If the CPU 311 determines that the update (rewriting) of the engine firmware does not normally terminate, the process goes to an error process 2.

If the CPU 311 determines in Step S2107 that the update of the engine firmware succeeds, the process goes to Step S2108. In Step S2108, the CPU 311 acquires updata about the controller firmware (update firmware data about the controller firmware). The updata about the controller firmware acquired in Step S2108 has the binary file format illustrated in FIG. 4, as described above.

The updata sequentially acquired from the update server 4 is temporarily stored in the RAM 313. The checksum is confirmed in the storage process. In Step S2109, the CPU 311 uses the result of the checksum to confirm the consistency of the updata.

If the CPU 311 determines in Step S2109 that the downloaded updata has no problems, the process goes to Step S2110. If the CPU 311 determines in Step S2109 that the downloaded updata has any problems, the process goes to the error process 2.

In Step S2110, the CPU 311 rewrites the old version of firmware stored in the flash ROM 312 with the updata about the controller firmware stored in the RAM 313. As illustrated in FIG. 3, the flash ROM 312 in the controller unit 31 has the two firmware storage areas (the firmware storage area A 10 and the firmware storage area B 11). Accordingly, the CPU 311 determines whether the updata is written in the firmware storage area A 10 or in the firmware storage area B 11. In this example, the CPU 311 acquires the versions of the firmware written in the firmware storage area A 10 and the firmware storage area B 11 from, for example, the basic parameters and performs the rewriting to the storage area where the older version of the controller firmware is stored.

In Step S2111, the CPU 311 determines whether the rewriting (update) succeeds. If the rewriting fails, the process goes to an error process 1.

If the CPU 311 determines that the rewriting succeeds, the process goes to Step S2112. In Step S2112, the CPU 311 extracts specific information about the root certificate included in the firmware, from the update firmware written in the flash ROM 312. The CPU 311 uses the extracted specific information to update the management table (not shown) of the root certificate in the RAM 313. Then, the firmware to be activated by the boot program is changed to the updated firmware and the update process in the controller unit 31 terminates. In this changing process, the version information about the firmware to be activated, stored in the basic parameters, is rewritten.

The specific information about the root certificate included in the update firmware, extracted in Step S2112, includes the name, type, serial code, and expiration date of the root certificate and address information indicating the location of the root certificate data. According to the present embodiment, the update firmware that is written is activated by the boot program to refer to the pointer identifying the location of the root certificate data written in the firmware data. Then, the specific information is acquired from the root certificate data included in the firmware.

The RAM 313 includes the management table (not shown) stored therein, which is used for managing the specific information about the root certificate in the printer apparatus 3. Accordingly, the specific information about the root certificate included in the update firmware, extracted in Step S2112, is used to update the content of the management table.

For example, if the root certificate included in the update firmware has the same kind as that of the root certificate held in the printer apparatus 3 and only the expiration date of the root certificate is updated, the CPU 311 updates information about the expiration date of the root certificate in the management table to information about the updated expiration date. If a new kind of root certificate data, which is not held in the printer apparatus 3, is included in the update firmware, the CPU 311 adds information about the new kind of root certificate to the management table. Performing the process described above allows the controller unit 31 in the printer apparatus 3 to update and manage the root certificate data. If the same root certificate data as the one held in the printer apparatus 3 is included in the update firmware, it is not necessary to update the specific information about the root certificate.

The error process corresponds to a recovery process when the update of the firmware fails. If the update of the controller firmware fails, the printer apparatus 3 cannot operate with the latest firmware. Accordingly, the firmware held in the printer apparatus 3 is activated by the boot program to avoid an occurrence of any problem. Since the recovery process is not related to the embodiments of the present invention, a description thereof is omitted herein.

When the printer apparatus 3 accesses the content server 2 to acquire the real file of printing content by the secure communication, the SSL/TLS module 140 in FIG. 5 refers to the management table stored in the RAM 313 to determine whether the secure communication with the content server 2 is available. If the validity of the server certificate transmitted from the content server 2 cannot be verified with the root certificate held in the printer apparatus 3, the printing is stopped or the update of the firmware data described above is performed. This is because the update firmware data stored in the update server 4 possibly includes the updated root certificate or a new root certificate.

As described above, according to the present embodiment, the printer apparatus 3 acquires the update firmware data in which the firmware data is integrated with the root certificate data, and the specific information about the root certificate is extracted from the acquired firmware data. The root certificate data is managed by using the extracted specific information to update the management table of the root certificate in the printer apparatus 3.

With the above configuration, it is possible to reliably acquire and update the root certificate data and to provide the function of acquiring and managing the root certificate data without greatly changing the original functional configuration. In addition, the manufacturer can provide the root certificate data to the information processing apparatus, such as the printer, about which the manufacturer cannot easily acquire the root certificate data, as part of the existing function of updating the firmware. Accordingly, it is possible to deliver the root certificate data without preparing a special service when new root certificate data is added to the printer apparatus 3.

Although the management table of the root certificate is provided in the RAM 313 in the present embodiment, the present embodiment is not limited to such a configuration.

According to the present embodiment described above, the serial codes in the root certificate data are individually described in the firmware update information file, and the CPU 311 in the controller unit 31 compares the described serial codes with the serial codes that are managed to determine whether the firmware is to be updated. However, the determination may be performed by other methods. For example, one or more pieces of root certificate data are managed as one group and a version number is allocated to the group. If the serial code of at least one of the pieces of root certificate data is changed to a new serial code or a new piece of root certificate data is added, the version number is incremented. The controller unit 31 compares the version number of the group of the pieces of the root certificate data with the version number of the group of the pieces of the root certificate data that is managed in the printer apparatus 3 to determine whether the group of the pieces of the root certificate data included in the firmware of the update server 4 is updated. Then, in the same manner as the one described above, the firmware is downloaded and the specific information about each root certificate included in the firmware is managed.

A second exemplary embodiment of the present invention will now be described. In the process of updating firmware according to the first exemplary embodiment, the controller firmware and the engine firmware are acquired and updated. In contrast, according to the present embodiment, only the firmware for which the update is necessary is acquired and updated.

For example, it is assumed that the firmware registered in the update server 4 has the update information illustrated in the file in FIG. 8. It is also assumed that the version number of the controller firmware incorporated in the printer apparatus 3 is "1.1" and that of the engine firmware incorporated therein is "1.1". In this case, since the engine firmware has the same version number as the firmware incorporated in the engine unit 32 in the printer apparatus 3, it is not necessary to update the engine firmware.

Figure 9B:
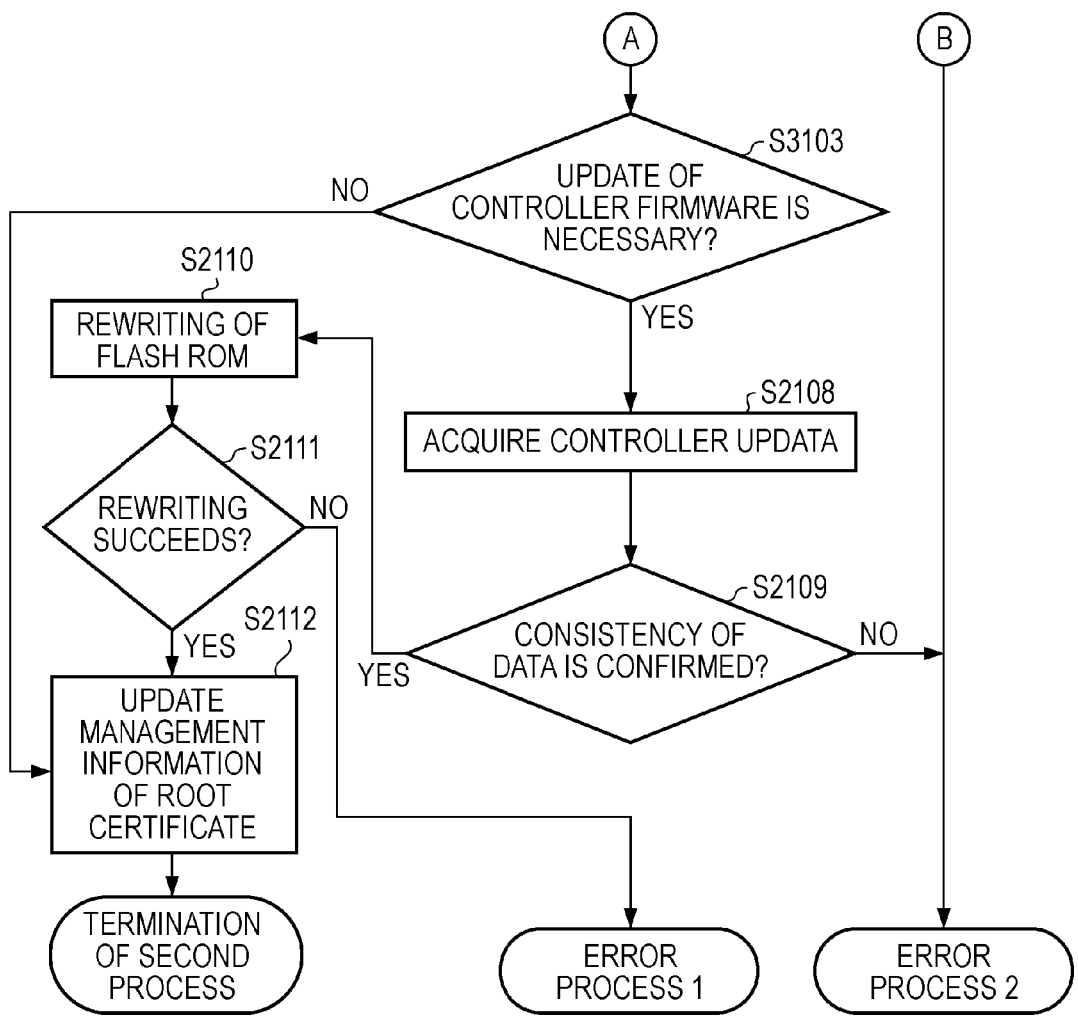

FIGS. 9A and 9B are flowcharts illustrating an example of a process of updating the firmware of the printer apparatus 3 according to the present embodiment. These flowcharts correspond to the second update process described above with reference to FIG. 7. Since the first update process according to the present embodiment is common to that in the first exemplary embodiment, a description of the first update process is omitted herein. The same step numbers are used in the flowcharts in FIGS. 9A and 9B to identify the same steps in the flowchart illustrated in FIG. 7. A description of such steps is omitted herein.

After the second update process is started, the CPU 311 performs Steps S2100 and S2101. In Step S3101, the CPU 311 determines whether update of the engine firmware is necessary. This determination is based on comparison between the version information described in the firmware update information file acquired in the first update process and the version information about the current engine firmware managed by the controller unit 31.

If the CPU 311 determines in Step S3101 that the update of the engine firmware is necessary, the process goes to Step S2102. Then, Steps S2102 to S2107 are performed in the manner described above.

If the CPU 311 determines in Step S3101 that the update of the engine firmware is not necessary, the process goes to Step S3102.

In Step S3102, the CPU 311 transmits a skip command indicating that the update of the engine firmware is omitted to the CPU 321 in the engine unit 32. The engine unit 32 receives the skip command and recognizes that the update of the engine firmware is not performed. After the CPU 311 transmits the skip command in Step S3102, the process goes to Step S3103.

In Step S3103, the CPU 311 determines whether the update of the controller firmware is necessary. Specifically, the CPU 311 compares the version information about the controller firmware described in the firmware update information file acquired in the first update process with the version information about the current controller firmware managed by the controller unit 31. The CPU 311 also compares the specific information about the root certificate described in the firmware update information file acquired in the first update process with the management information about the current root certificate managed by the controller unit 31.

The version information about the firmware currently incorporated in the printer apparatus 3 is stored in the basic parameter storage area 13 in the flash ROM 312. Accordingly, in the determination in Step S3103, the version information about the controller firmware described in the acquired firmware update information file is compared with the version information stored in the basic parameter storage area 13. The root certificate data currently incorporated in the printer apparatus 3 is stored in the management table in the RAM 313. Accordingly, in the determination in Step S3103, the specific information about the root certificate described in the acquired firmware update information file is compared with the information stored in the management table.

If at least one of the version information about the controller firmware and the root certificate data is updated, the CPU 311 determines in Step S3103 that the update of the controller firmware is necessary and the process goes to Step S2108. As for the root certificate data, the CPU 311 determines that the update of the controller firmware is necessary also if a root certificate different from the root certificate currently held in the printer apparatus 3 is stored in the update server 4. This determination is the same as Step S1005 in FIG. 6.

Since Step S2108 and the subsequent steps are similar to the ones in the first exemplary embodiment, a description is omitted herein.

As described above, according to the present embodiment, the version information about the engine firmware and the controller firmware and the specific information about the root certificate are used to download and update only the firmware for which the update is necessary. Consequently, it is possible to suppress unnecessary update of the firmware. In addition, it is possible to reliably acquire and update the root certificate data and to provide the function of acquiring and managing the root certificate data without greatly changing the original functional configuration.

According to the present embodiment, even if the update of either the controller firmware or the root certificate data is necessary, both the controller firmware and the root certificate data are updated. This is because the binary file in which the root certificate data is held as part of the firmware data is acquired and the binary file is directly stored in the storage area in the flash ROM 312. However, the printer apparatus 3 may have a configuration in which a dedicated storage area for the root certificate data is provided in the flash ROM 312 and the real part of the root certificate data is extracted from the binary file to store the extracted part in the dedicated storage area. In this case, the printer apparatus 3 may be configured to update only part of the acquired update firmware, for which the update is necessary. Specifically, if only the root certificate data in the firmware data in the update server 4 is updated, update controller firmware data including the root certificate data is acquired and the acquired update controller firmware data is temporarily stored in an arbitrary area in the flash ROM 312. Then, the firmware data is activated to identify the location of the root certificate data. The root certificate data at the location is extracted and the extracted root certificate data is stored in the dedicated storage area. Part of the acquired update firmware data, for which the update is necessary, can be updated by other methods, to which the embodiments of the present invention are applicable.

A third exemplary embodiment of the present invention will now be described. According to the first and second exemplary embodiments of the present invention, the printer apparatus 3 accesses the update server 4 to acquire the firmware data and the root certificate data.

In contrast, according to the third exemplary embodiment of the present invention, a computer 5 accesses the update server 4 to acquire the controller firmware data and the root certificate data. The computer 5 is connected to the printer apparatus 3 to transmit and receive data to and from the printer apparatus 3 and is also connected to an external network. A CPU (not shown) in the computer 5 executes programs for the update of the firmware to operate. In other words, according to the present embodiment, an information processing system includes the computer 5 acquiring the firmware and the printer apparatus 3 using the acquired firmware to perform the update.

Figure 10:
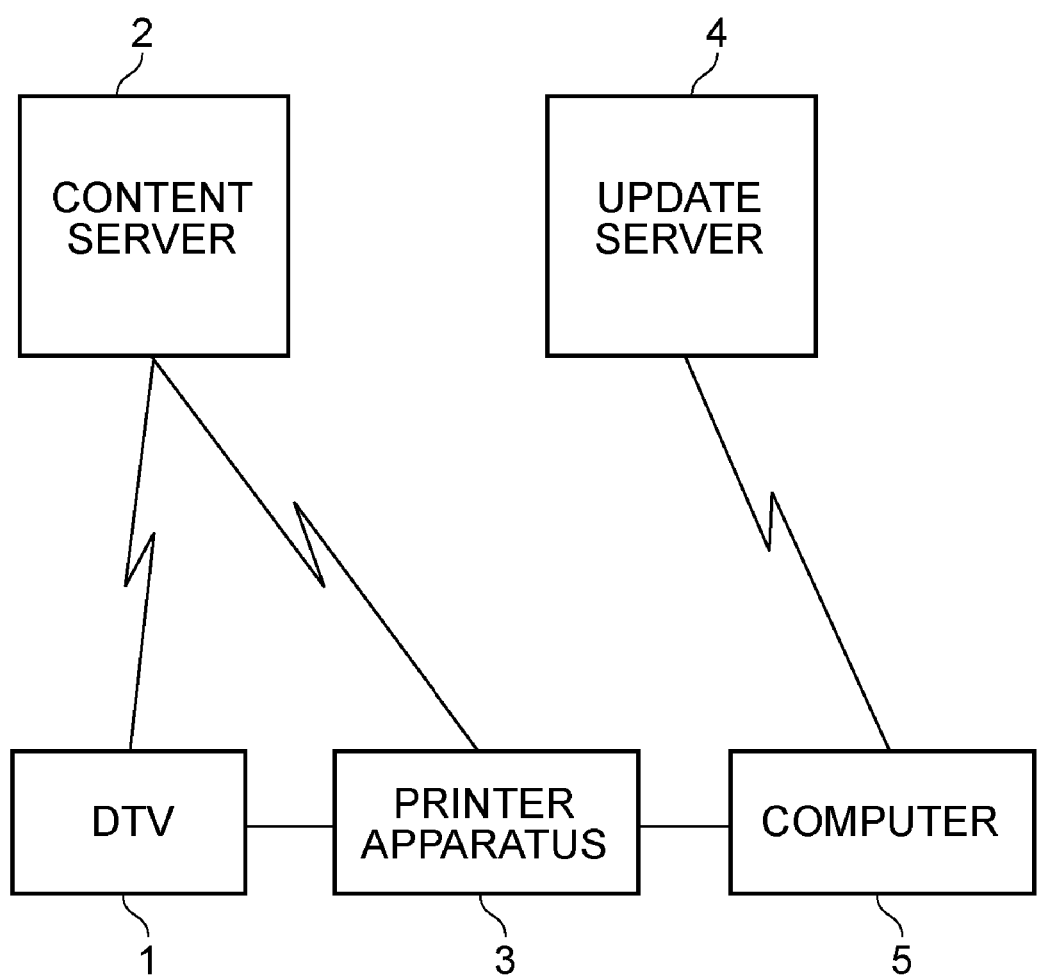
FIG. 10 is a block diagram illustrating an example of the configuration of an information processing system according to a third exemplary embodiment of the present invention.

FIG. 10 is a block diagram illustrating an example of the configuration of the information processing system according to the present embodiment. The information processing system according to the present embodiment includes the computer 5 connected to the printer apparatus 3, in addition to the system configuration according to the first and second exemplary embodiments. The computer 5 is capable of communication with the printer apparatus 3 via, for example, a LAN and can be connected to the Internet via a router. The computer 5 can access the update server 4.

According to the present embodiment, in the update of the firmware performed by the controller unit 31 in the printer apparatus 3 in the first and second exemplary embodiments of the present invention, the acquisition of at least the firmware update information file and the updata is performed by the computer 5. The computer 5 transfers the firmware update information file acquired by accessing the update server 4 to the printer apparatus 3, and the printer apparatus 3 determines whether the update is necessary.

If the printer apparatus 3 determines that the update is necessary, the printer apparatus 3 transmits a request for update to the computer 5. The computer 5 accesses the update server 4 to acquire the updata and transfers the acquired updata to the printer apparatus 3. The printer apparatus 3 receives the file necessary for the update. Since the processing after the printer apparatus 3 acquires the updata is similar to the one according to the first and second exemplary embodiments of the present invention, a description is omitted herein.

According to the present embodiment, the computer 5 may perform other processing, in addition to the update of the controller firmware of the printer apparatus 3 and the root certificate data. For example, the computer 5 may manage the version information about the firmware of the controller unit 31 and the firmware of the engine unit 32 in the printer apparatus 3 and the version information about the root certificate. In other words, the computer 5 holds the basic parameters and information in the management table according to the first and second exemplary embodiments of the present invention as management information. The computer 5 compares the management information with the version information about the firmware, held in the update server 4.

If the computer 5 determines that it is necessary to update the firmware or the root certificate based on the comparison result, the computer 5 accesses the update server 4 to download the firmware that is required. The computer 5 determines whether the printer apparatus 3 is in an operation state in which the printer apparatus 3 can update the firmware. If the computer 5 determines that the printer apparatus 3 is in the operation state in which the printer apparatus 3 can update the firmware, the computer 5 transfers the firmware to the printer apparatus 3.

The above flow corresponds to the flow in which the necessary firmware is downloaded to update the firmware according to the second exemplary embodiment of the present invention. Part of the flow according to the first exemplary embodiment of the present invention may be performed by the computer 5.

As described above, according to the present embodiment, it is possible to suppress unnecessary update of the firmware. In addition, it is possible to reliably acquire and update the root certificate data and to provide the function of acquiring and managing the root certificate data without greatly changing the original functional configuration.

The embodiments of the present invention can be realized by supplying a storage medium including program code of software realizing the functions according to the above embodiments to a system or an apparatus, the computer (or the CPU or the micro processing unit (MPU)) in which system or apparatus reads out and executes the program code stored in the storage medium. In this case, the program code itself read out from the storage medium realizes the functions of the embodiments described above. The present invention is applicable to the storage medium having the program code stored therein. The storage medium supplying the program code may be any storage medium, such as a floppy disk, a hard disk, an optical disk, a magneto-optical disk, a CD-ROM, a compact disc-recordable (CD-R), a magnetic tape, a non-volatile memory card, or a ROM.

The computer that executes the readout program code realizes the functions of the embodiments described above. In addition, the operating system (OS) or the like running on the computer may execute all or part of the actual processing on the basis of instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing on the basis of instructions in the program code to realize the functions of the embodiments described above.

As described above, with the information processing apparatus, the control method for the information processing apparatus, and the information processing system according to the embodiments of the present invention, it is possible to reliably acquire and update the root certificate data and to provide the function of acquiring and managing the root certificate data without greatly changing the original functional configuration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-313116 filed Nov. 20, 2006, which is hereby incorporated by reference herein in its entirety.

What is claimed is:

1. An information processing apparatus comprising:
a storage unit configured to store firmware data for controlling the information processing apparatus and root certificate data used in secured communication;
at least one controller, the controller being programmed to control one or more of:
a managing unit configured to perform management by storing specific information in a root certificate into a management table in the storage unit, the root certificate currently managed by the managing unit, the specific information including at least a first serial code for identifying the root certificate data stored in the storage unit and an expiration date allocated to the root certificate, wherein the first serial code of the root certificate data is an identification code specific to the root certificate;
an acquiring unit configured to acquire a second serial code of root certificate data formed as part of firmware data stored in an external apparatus capable of communicating with the information processing apparatus, from a firmware update information file, the firmware update information file including the version number of the firmware data stored in the external apparatus, the second serial code of root certificate data formed as part of firmware data stored in the external device and location information indicating the location of the firmware data;
a comparing unit configured to compare the second serial code included in the firmware update information file acquired by the acquiring unit with the first serial code of the root certificate currently managed by the managing unit, wherein the acquiring unit is configured to acquire the firmware data stored in the external apparatus based on the location information included in the firmware update information file if, in accordance with a result obtained by the comparison performed by the comparing unit, the second serial code acquired by the acquiring unit is different from the first serial code of the root certificate currently managed by the managing unit; and
an updating unit adapted to extract, from the firmware data acquired by the acquiring unit, specific information including the second serial code of the root certificate data formed as part of the firmware data to write the extracted specific information into the management table.

2. A control method for an information processing apparatus, the information processing apparatus including a storage unit configured to store firmware data for controlling the information processing apparatus and root certificate data used in secured communication, and at least one controller, the controller being programmed to control a managing unit that performs management by storing specific information in a root certificate into a management table in the storage unit, the root certificate currently managed by the managing unit, the specific information including at least a first serial code for identifying the root certificate data stored in the storage unit and an expiration date allocated to the root certificate, wherein the first serial code of the root certificate data is an identification code specific to the root certificate, the control method comprising:
acquiring a second serial code of root certificate data formed as part of firmware data stored in an external apparatus capable of communicating with the information processing apparatus from a firmware update information file, the firmware update information file including the version number of the firmware data stored in the external apparatus, the second serial code of root certificate data formed as part of firmware data stored in the external device and location information indicating the location of the firmware data;

comparing the second serial code included in the firmware update information file with the first serial code of the root certificate currently managed by the managing unit;

acquiring the firmware data stored in the external apparatus based on the location information included in the firmware update information file if, in accordance with a result obtained in the comparing, the second serial code is different from the first serial code of the root certificate currently managed by the managing unit; and an extracting, from the acquired firmware data, specific information including the second serial code of the root certificate data formed as part of the firmware data to write the extracted specific information into the management table.

* * * * *